United States Patent

Deyo

[15] 3,643,111

[45] Feb. 15, 1972

[54] MEMORY CIRCUIT

[72] Inventor: Charles R. Deyo, 7800 Gaston Avenue, Fort Worth, Tex. 76107

[22] Filed: Dec. 30, 1969

[21] Appl. No.: 889,035

[52] U.S. Cl. ....................307/238, 307/251, 307/304, 340/173

[51] Int. Cl. ....................G11c 11/24, G11c 11/34

[58] Field of Search ....................307/238, 251, 304; 340/173

[56] References Cited

UNITED STATES PATENTS 3,386,081 5/1968 Varsos ....................307/251 X

*Primary Examiner*—John Zazworsky
*Attorney*—Wofford and Felsman

[57] ABSTRACT

This specification discloses a memory circuit characterized by a field effect transistor having its gate connected with a capacitor means, a memory setting means for charging the capacitor means, and a memory resetting means for discharging the capacitor means. The memory setting means and the memory resetting means incorporate inverting circuits to enable using an economical junction field effect transistor in the memory circuit and yet have the memory circuit remain compatible with conventional logic circuits.

11 Claims, 1 Drawing Figure

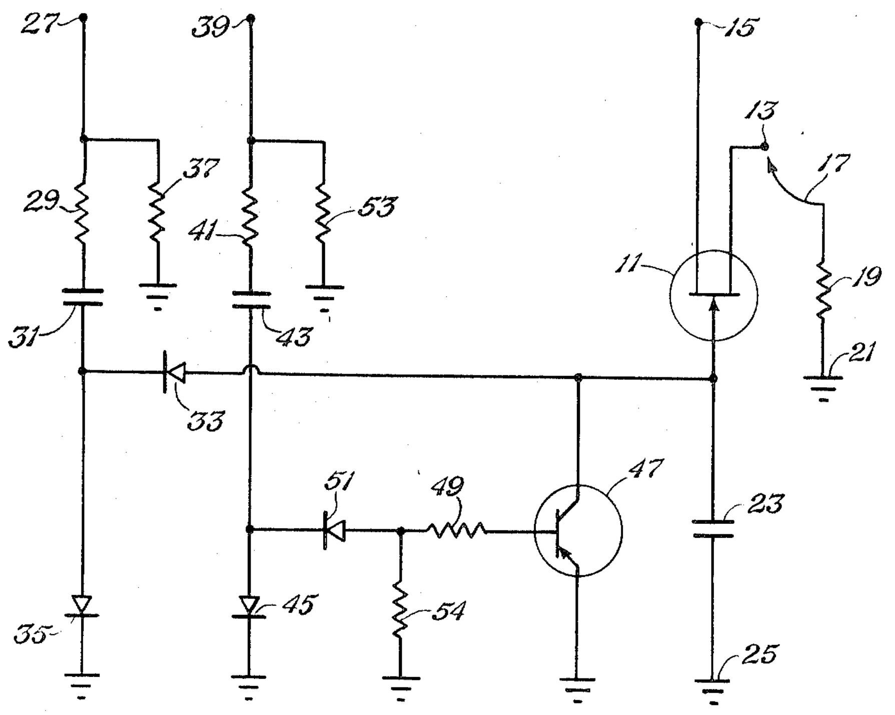
INVENTOR
Charles R. Deyo
BY
Wofford & Felsman
ATTORNEY

MEMORY CIRCUIT

BACKGROUND OF THE INVENTION

1. Field of the Invention

This invention relates to memory circuits and more particularly to memory circuits that can be employed with conventional logic circuits.

2. Description of the Prior Art

Memory devices have long been employed. The number and significance of memory devices have increases substantially since the advent of computers. Capacitive memories have been built using metal-oxide-semiconductor field effect transistors (MOS FETS) and using insulated gate field effect transistors (IG FETS). Such memory circuits have been expensive and, hence, not economically feasible. The more economical field effect transistors; such as, the junction field effect transistors; normally require a negative bias to render them nonconductive. Therefore, any memory circuits employing such economical field effect transistors would not have been compatible with conventional logic, so they were not considered feasible.

BRIEF DESCRIPTION OF THE DRAWING

The Figure is a schematic illustration of one embodiment of the invention.

DESCRIPTION OF PREFERRED EMBODIMENT

It is a primary object of this invention to provide a memory circuit that is compatible with conventional logic circuits yet that enables employing economical field effect transistors which normally require a negative bias to be rendered nonconductive.

It is a specific object of this invention to provide an economical memory circuit feasible for production in large numbers for incorporating into complex electronic apparatus; such as, computers.

The foregoing and other objects are accomplished in accordance with this invention by a normally conductive field effect transistor connected to effect a logic output of unity (1) except when it's gate is negatively biased, the gate being connected with a capacitor means; a memory setting means incorporating a pulse inverting circuit for inducing a charge onto the capacitor means; and a memory resetting means incorporating a switch means for effecting discharge of the capacitor means and an actuating means incorporating a pulse inverting circuit for rendering the switch means conductive. In this way, the positive output of conventional logic circuits is inverted to effect the requisite negative bias to prevent conduction of the field effect transistor or alternatively, to actuate the switch means and discharge the capacitor means.

Referring to the Figure, field effect transistor 11 is connected to afford a normally conductive path to a read terminal 13. Power is supplied from a power terminal 15. Power terminal 15 may be one electrode of a battery or one terminal of other direct current (DC) or a terminal of an alternating current (AC) source. It may be, for example, a terminal, or juncture, in an electronic computer. A sampling circuit 17 reads the output on read terminal 13 serially through a suitable load 19 to a common, or ground, terminal 21. Load 19 is selected to afford an indication of power on read terminal 13. Such an indication of power also indicates lack of occurrence of the event activating the memory.

Capacitor means 23 is connected with the gate of field effect transistor 11 and with common terminal 25. Common 25 may be the same as common 21. When capacitor means 23 is charged to negatively bias the gate of field effect transistor 11, conduction of field effect transistor 11 is inhibited. Load 19 in sampling circuit 17 reads the equivalent of either a zero (0) when conduction is inhibited or a 1 when power is conducted by field effect transistor 11 to read terminal 13.

A memory setting means is provided for inducing a charge onto capacitor means 23. The memory setting means incorporates an inverting circuit. Specifically, set terminal 27, resistor means 29, capacitor 31, second diode means 35 and common 25 are serially connected for charging capacitor 31 when power is supplied to set terminal 27. Diode means 33 and capacitor means 23 are connected in parallel with second diode means 35. Resistor means 37 and 29, capacitor 31, diode means 33 and capacitor means 23 are serially connected. Resistor means 37 is serially connected with set terminal 27 and common 25 to enable charging capacitor 31 and to provide a route for capacitor 31 to discharge into and charge capacitor means 23. Resistor means 37 may be an internal impedance of a source supplying power.

I have found that resistor means 29 is necessary if the memory circuit is to be set only on a trailing edge of a set pulse. Without resistor means 29, charging capacitor 31 effects transients that are sufficient in magnitude to effect setting of capacitor means 23. Resistor means 29 slows the charging of capacitor 31 and prevents these transients.

A memory resetting means is provided for effecting discharge of capacitor means 23. Specifically, reset terminal 39, second resistor means 41, second capacitor 43, third diode means 45 and common 25 are connected in series for charging second capacitor 43 when power is supplied to reset terminal 39. A switch means is connected to each side of capacitor means 23 for effecting discharge of the capacitor means. An actuating means is connected to the switch means and to the juncture of the second capacitor 43 and third diode means 45 for actuating the switch means. Specifically, transistor 47 is connected with the juncture of capacitor means 23 and the gate of field effect transistor 11 and with common 25 for effecting discharge of capacitor means 23. The base of transistor 47 is serially connected with resistor means 49, fourth diode means 51 and the juncture of third diode means 45 and second capacitor 43. Resistor means 53 is serially connected with reset terminal 39 and common 25 to enable charging capacitor 43 and to provide a route for second capacitor 43 to discharge around to bias the base of transistor 47. Resistor means 53 may be an internal impedance of a source supplying power.

I have found that also employing resistor means 54 connected to ground and to the juncture of resistor means 49 and fourth diode means 51, facilitates proper biasing of transistor 47, smooths operation of transistor 47 and reduces collector-emitter leakage through transistor 47.

In operation, the memory circuit as illustrated in the FIGURE, draws no power except when it is being read by read circuit 17. Upon the occurrence of a condition designed to alter the output on read terminal 13, power, which may be in the form of a set pulse, is supplied to set terminal 27, charging first capacitor 31 through resistor means 29 and diode means 35. Upon cessation of power at set terminal; for example, on the falling edge of a set pulse; capacitor 31 discharges through diode means 33, resistor means 29 and resistor means 37 into capacitor means 23 until both are at substantially the same potential. The voltage on the gate of field effect transistor 11 is then negative with respect to ground and is sufficiently negative to inhibit, or render nonconductive, field effect transistor 11.

The only discharge paths for capacitor means 23 is through gate of field effect transistor 11, the leakage of transistor 47, and diode means 33; none of which effect large leakage losses. Memory times in excess of 1 hour are readily obtained, employing one-tenth microfarad capacitors for capacitor means 23.

Upon cessation of the condition effecting the charging of the memory, the memory is reset. To effect resetting of the memory, power is supplied to reset terminal 39. The power may be in the form of a reset pulse. The pulse inverter circuit in the memory resetting means applies a negative bias to the base of transistor 47, allowing transistor 47 to conduct and short the negative voltage on capacitor means 23 to ground, or common. Thereby capacitor means 23 is discharged and field effect transistor 11 is rendered conductive until power is again supplied to set terminal 27 to charge capacitor means 23.

Specifically, when power is removed from reset terminal, second capacitor 43 discharges via resistor means 41, 53, and 54 and diode 51 to negatively bias the base of transistor 47 via resistor means 49. Diode means 45 blocks straight discharge of second capacitor 43.

From the foregoing, it can be seen that the capacitive memory circuit of this invention enables employing economical junction field effect transistors, yet through the use of pulse inverting circuits, is compatible with conventional logic circuits. The memory circuit of this invention is advantageous in that no power is required except when the memory is being read.

Furthermore, the memory circuit is economical. I have found, for example, that the complete memory circuit may be built for less than conventional memory circuits, and thus becomes economically feasible for mass production and large scale use.

Although the invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. A memory circuit comprising:

a. a capacitor means for storing an electrical charge;

b. a field effect transistor having its gate connected with one side of said field capacitor means so as to inhibit conduction of said field effect transistor when said capacitor is charged to negatively bias said gate, having one conducting lead for connecting with a terminal for supplying power and the other conducting lead for connecting with a terminal for reading a digital logic output of said memory circuit; said field effect transistor being normally conductive and being rendered substantially nonconductive by said negative bias on said gate;

c. a memory setting means connected with said capacitor means for inducing a charge onto said capacitor means so as to negatively bias said gate sufficiently to render said field effect transistor substantially nonconductive;

said memory setting means comprising a trailing edge pulse inverting circuit for changing a positive signal as from a conventional logic output to a negative-going signal for storing on said capacitor means; and d. a memory resetting means connected with said capacitor means for effecting discharge of said capacitor means.

2. The memory circuit of claim 1 wherein said memory setting means comprises a first capacitor connected in series with said capacitor means; a diode means connected in parallel with said capacitor means and in series with said first capacitor; and means for serially connecting said first capacitor to terminals of a power source for supplying an electrical charge thereto.

3. The memory circuit of claim 2 wherein a second diode means is connected in series with said first capacitor and said capacitor means.

4. The memory circuit of claim 3 wherein a first resistor means is serially connected with said first capacitor and with a set terminal for connection with one terminal of said power source, and a second resistor means connected in series with said set terminal and a common terminal and connected in parallel with said first capacitor.

5. The memory circuit of claim 2 wherein said power source has an internal impedance that serves as a part of a circuit effecting series connection of said first capacitor and said capacitor means and is connected in series with a resistor means that is connected in series with said first capacitor and said internal impedance.

6. The memory circuit of claim 1 wherein said memory resetting means comprises a switch means connected with both sides of said capacitor means for discharging said capacitor means, and an actuating means connected with said switch means for actuating said switch means and incorporating a pulse inverting circuit for actuating said switch means in response to a positive pulse.

7. The memory circuit of claim 1 wherein said memory resetting means comprises a third resistor means, a second capacitor, and a third diode means for connecting in series with terminals of a power source for supplying an electric charge to said second capacitor; a switch means connected to each side of said capacitor means for effecting discharge of said capacitor means; and an actuating means connected to said switch means and to the juncture of said second capacitor and said third diode means for actuating said switch means when said second capacitor is discharged.

8. The memory circuit of claim 7 wherein said switch means comprises a transistor and said actuating means comprises the base of said transistor connected in series with a fourth diode means and to said juncture, and a fourth resistor means connected in parallel with said third diode means.

9. The memory circuit of claim 8 wherein a fifth resistor means is serially connected with said second capacitor via said third resistor means and with said base of said transistor via said fourth resistor means, and a sixth resistor means is serially connected with the base of said transistor and the juncture of said fourth resistor means and said fourth diode means.

10. The memory circuit of claim 8 wherein said power source is connected with said memory circuit and has an internal impedance that is a part of a circuit effecting series connection of said second capacitor and said fourth diode means and is connected in series with said third resistor means and said fourth resistor means.

11. The memory circuit of claim 10 wherein a sixth resistor means is connected in series with said base of said transistor and the juncture of said fourth diode means and said fourth resistor means.

* * * * *